United States Patent [19]

Fanta et al.

[11] Patent Number: 5,550,177

[45] Date of Patent: Aug. 27, 1996

[54] STARCH AND POLY (ETHLENE-CO-ACRYLIC ACID) PASTES AND GELS, AND METHOD FOR THEIR MAKING

[75] Inventors: George F. Fanta; Donald D. Christianson, both of Peoria, Ill.

[73] Assignee: The United States of America as represented by the Secretary of Agriculture, Washington, D.C.

[21] Appl. No.: 843,333

[22] Filed: Feb. 28, 1992

[51] Int. Cl.$^6$ ............................. C08L 3/00; C08L 89/00
[52] U.S. Cl. ............................................. 524/47; 524/52
[58] Field of Search ............................................ 524/47, 52

[56] References Cited

U.S. PATENT DOCUMENTS

| | | |
|---|---|---|
| 3,133,836 | 5/1964 | Winfrey et al. . |
| 4,133,784 | 1/1979 | Otey et al. . |
| 4,337,181 | 6/1982 | Otey et al. . |
| 4,454,268 | 6/1984 | Otey et al. ............................. 524/52 |

FOREIGN PATENT DOCUMENTS

WO90/10671  9/1990  WIPO .

OTHER PUBLICATIONS

Maxwell, C. S., "Effect of Ethylene Copolymer–Starch Blends on Water Resistance of Paper", Tappi 53(8): 1464–1466 (Aug. 1970).

Fanta, G. F., Swanson, C. L., and Doane, W. M., "Composites of Starch and Poly(ethylene–co–acrylic acid). Complexing between Polymeric Components", J. of Applied Poly. Sci. 40: 811–821 (1990).

*Primary Examiner*—Paul R. Michl
*Assistant Examiner*—Lavonda R. DeWitt
*Attorney, Agent, or Firm*—M. Howard Silverstein; John D. Fado; Curtis P. Ribando

[57] ABSTRACT

Aqueous ambient temperature pastes and gels of starch and poly(ethylene-co-acrylic acid) are disclosed containing starch in an amount from about 2.5% to about 10%, by weight, of the paste or gel, and poly(ethylene-co-acrylic acid) in an amount from about 0.5% to about 20%, by weight, of the starch, the poly(ethylene-co-acrylic acid) content being sufficient to provide aqueous ambient temperature pastes having higher viscosities than the same ambient temperature pastes without poly(ethylene-co-acrylic acid) and to provide aqueous ambient temperature gels having different gel strengths from the same ambient temperature gels without poly(ethylene-co-acrylic acid). These pastes and gels are prepared by a method in which a starch and poly(ethylene-co-acrylic acid) mixture in an aqueous medium is cooked, preferably by steam-jet cooking, and the resulting starch-poly(ethylene-co-acrylic acid) solution/dispersion is cooled to ambient temperature with water retained in the solution/dispersion.

8 Claims, No Drawings

STARCH AND POLY (ETHYLENE-CO-ACRYLIC ACID) PASTES AND GELS, AND METHOD FOR THEIR MAKING

This invention relates to composite compositions of starch and poly(ethylene-co-acrylic acid) (EAA).

Aqueous starch dispersions have a number of practical applications as thickening and gelling agents. Altering the rheological properties of these starch dispersions would broaden their practical applications. For example, increases in the viscosities of starches would enhance their value as thickeners for aqueous systems. As another example, retrogradation of high amylose starch pastes into rigid gels is a major problem that limits the use of cooked high amylose starch in applications requiring storage after cooking. An effective method of dealing with this problem so as to produce softer high amylose gels would be of great value.

Starch-EAA blends have been used as substitutes for synthetic thermoplastic films. U.S. Pat. Nos. 4,133,784 and 4,337,181 to Otey et al. describe starch-EAA films useful as biodegradable agricultural mulches or packaging films. There also has been interest in starch-EAA blends for use as additives or coatings for paper. In, Maxwell, C. S., "Effect of Ethylene Copolymer-Starch Blends on Water Resistance of Paper", Tappi 53(8):1464–1466 (August 1970), starch-EAA blends are used as water resistant paper sizes.

SUMMARY OF THE INVENTION

The invention is based on the discovery that the ambient temperature rheology of cooked aqueous starch pastes and gels is significantly altered by adding appropriate amounts of EAA to aqueous starch suspensions before cooking. The addition of as little as 0.5% EAA, based on the dry weight of starch, significantly increases the viscosity of a cooked starch paste at ambient temperatures. Also, the EAA addition significantly alters the gelling properties of a starch-EAA paste that has been allowed to stand for a period of time at ambient temperature. Starches with high percentages of amylopectin normally do not form firm gels upon standing at ambient temperature; however, after cooking with EAA, such starches gel rapidly into firm gels. On the other hand, the presence of EAA in cooked high amylose starch compositions reduces the gel strength producing softer high amylose starch gels.

The compositions of the invention are aqueous ambient temperature pastes and gels that include starch, EAA and water, the starch being from about 2.5% to about 10%, by weight, of the paste or gel, and the EAA being from about 0.5% to about 20%, by weight, of the starch, the EAA content being sufficient to provide an aqueous ambient temperature paste or gel having a higher viscosity and substantially different gel properties than the same ambient temperature composition without EAA.

These aqueous ambient temperature starch-EAA pastes and gels are made by a method that comprises heating a mixture of starch and EAA in an aqueous medium to obtain a cooked aqueous solution/dispersion of the starch and the EAA, and cooling the aqueous solution/dispersion to ambient temperature with water retained in the composition, the starch being from about 2.5% to about 10%, by weight, of the paste or gel, and the EAA being from about 0.5% to about 20%, by weight, of the starch, the EAA content being sufficient to: 1) provide an aqueous ambient temperature starch paste having a higher viscosity than the same ambient temperature starch paste without EAA; and, 2) provide a gel, upon standing at ambient temperature, having properties substantially different from starch gels prepared without EAA.

DETAILED DESCRIPTION

The starch-EAA compositions of the invention preferably are prepared with unmodified starches from cereal grains or root crops such as corn, potato and wheat. Unmodified starches are native starches; they have not been modified chemically. Unmodified starches having amylose and amylopectin components in varying proportions also may be used. Specific starches that may be used are cornstarch, waxy cornstarch, high amylose cornstarch, potato starch, and wheat starch.

EAA copolymers that are dispersible in aqueous media are used in the compositions. EAA comprises copolymerized acrylic acid and ethylene. The pendant carboxyl groups of the acrylic acid component contribute to the water dispersibility of the copolymer and thus promote complexing of the copolymer with hydrophilic starch. Therefore, EAA having acrylic acid and ethylene within a range of proportions works successfully to form the starch-EAA complexes of the invention if the EAA contains a sufficient number of carboxyl groups to be dispersible in aqueous media when carboxyl groups are converted to carboxylate salts through reaction with ammonium or alkali metal hydroxide. A preferred copolymer contains about 20% copolymerized acrylic acid and 80% ethylene by weight and has a melt index of 300, a weight-average molecular weight of about 18,000, and a number-average molecular weight of about 7,000.

As a solvent system, aqueous media are used in which both the starch and the EAA are dispersible whereby they may be intimately mixed. The preferred solvent systems are aqueous ammonium hydroxide, aqueous alkali metal hydroxide, or mixtures thereof.

A mixture of starch and EAA is prepared prior to cooking by first dispersing EAA in an aqueous alkaline medium and then adding granular starch. For example, starch may be added to a 5% or 10% solution/dispersion of EAA in aqueous ammonium hydroxide. An aqueous alkaline solution/dispersion of EAA may also be added to a cooked aqueous solution/dispersion of starch.

Starch and EAA are mixed in the relative amounts needed to produce a desired proportion of starch to EAA, by weight, in a heated aqueous solution/dispersion. Starch amounts in this specification are given by weight as the percent solids in each cooked aqueous starch-EAA solution/dispersion. EAA amounts are given by weight as the percent based on starch.

In each case, a sufficient amount of EAA in proportion to the amount of starch, is selected to provide an aqueous ambient temperature composition that: 1) has an increased viscosity over the same ambient temperature composition without EAA; 2) in the case of high amylopectin gels, provides a higher strength gel; and, 3) in the case of high amylose gels, provides a lower strength, or softer, gel.

Ambient temperature throughout this specification refers to temperatures in the range of about 35° C. and lower.

The starch content of the heated aqueous solution/dispersion and the resulting paste or gel may vary from about 2.5% to about 10%. The EAA content may vary from as little as about 0.5% up to about 20%. The remaining content is essentially water. Trace amounts of inorganic water solubles like ammonia also may be present. The EAA content to be used for a particular application is governed by the amount of starch in the system and the viscosity level or gel strength desired. Increasing the concentration of starch in water and the level of EAA based on starch produces higher viscosities. The viscosities of dispersions with different amounts of starch can be the same if the level of EAA based on starch is adjusted to the appropriate amount. For practical applications, EAA contents less than 10% are preferred because of the relatively high cost of EAA as compared with starch.

Specific starch-EAA amounts producing compositions with ambient temperature viscosities higher than the same starch compositions without EAA include: 10% starch with EAA from as little as about 0.5% up to about 1.0%; 6% starch with EAA from as little as 0.83% up to 1.67%; 5% starch with EAA from about 1% up to about 10%; and, 2.5% starch with EAA from about 5% up to about 20%. Specific high amylose starch-EAA compositions producing increased ambient temperature viscosities together with lower gel strength, i.e. softer gels, compared with the same starch compositions without EAA include high amylose cornstarch at 5% with EAA at 5%. Specific high amylopectin starch-EAA compositions produce increased ambient temperature viscosities and firm gels, compared with non-gelling propeties of these same starch compositions without EAA. These specific starches include waxy cornstarch and potato starch.

The mixed aqueous starch-EAA suspension then is cooked by heating to a temperature and for a period of time needed to disperse and solubilize the starch in the EAA solution/dispersion to obtain an intimately mixed aqueous solution/dispersion. The starch granules should be sufficiently swollen and disrupted that they form a smooth viscous dispersion in the aqueous medium. In one embodiment, the suspensions are heated to 85° C. or 95° C. and held at this temperature for 30 minutes. The maximum temperature during cooking could be limited by foaming at higher temperatures caused by the evaporation of ammonia from the media. Stirring during this cooking phase is preferred to insure uniform heating throughout the solution/dispersions. Also, water must be retained in the solution/dispersions by inhibiting water evaporation with appropriate apparatus. With conventional cooking of the starch-EAA suspensions, i.e. heating to 95° C. or below, only a minor percentage of starch, roughly 25%, is solubilized while the major fraction is made up of swollen granules and granule fragments. The solubilized portion comprises mostly amylose while the unsolubilized portion comprises mostly amylopectin.

Steam-jet cooking is an alternative, and preferred, cooking means. In steam-jet cooking, the aqueous starch-EAA slurry is pumped through an orifice where it contacts a jet of high pressure steam. These high-temperature, high-shear conditions totally disrupt the structure of starch granules so that little or no insoluble starch is found in the dispersion produced. Thus, in contrast to conventional cooking, both the amylose and amylopectin components of starch are dissolved. Steam-jet cooking of aqueous starch-EAA suspensions, therefore, is a convenient technique for totally solubilizing starch and for achieving an intimate mixture of the two polymers.

Steam-jet cooking is described in more detail in U.S. Pat. No. 3,133,836, to Winfrey and Black, the disclosure of which is incorporated herein by reference. In a preferred embodiment, steam-jet cooking is carried out at 140° C. with steam at 40 psig and a pumping rate of about 1.1 liter per minute. Somewhat higher starch concentrations than those desired in the final dispersion are used to allow for dilution of the cooked dispersions with condensed steam.

The choice of conventional cooking versus steam-jet cooking affects the range of the ingredients that produce enhanced results, but with either cooking procedure, as little as 1% EAA causes significant increases in the viscosities of ambient temperature starch-EAA compositions.

Much of the excess ammonia in the media is volatilized during steam-jet cooking, yet starch-EAA dispersions remain mildly alkaline and show a pH of about 9, depending on the amount of aqueous alkaline EAA solution/dispersion used relative to starch.

The ability of EAA to disperse and dissolve in water can be inhibited by low pH. Since ammonia is easily lost by volatilization, steam-jet cooking lowers the pH of the dispersion thereby reducing the ability of EAA to form complexes with starch. More ammonia or another alkali such as sodium hydroxide counteracts this effect. In the presence of additional alkali, loss of ammonia through volatilization has relatively little effect upon complex formation, and complexation occurs readily. With some starches having a significant amylopectin component, viscosities of starch-EAA dispersions cooked in the presence of additional alkali, such as sodium hydroxide, are therefore substantially higher than those in the absence of additional alkali. The high temperatures encountered during steam-jet cooking facilitate the dispersion of EAA in water.

After cooking, the resulting aqueous starch-EAA solution/dispersion is cooled to ambient temperature. As with the heating phase, water is retained in the solution/dispersion during cooling. The starch-EAA solution/dispersions thicken rapidly upon cooling yielding large viscosity increases owing to complex formation between starch and EAA. Depending upon the extent of complex formation, products ranging from thick fluid pastes to opaque solid gels are obtained. Preferably, the solution/dispersions are stirred during cooling. Stirring may be continued until reaching temperatures as low as 22° C. and continued for a period of time thereafter. Maximum viscosities of the resultant aqueous starch-EAA compositions occur either slightly before, upon, or slightly after reaching ambient temperature. Continued stirring at ambient temperature also may result in slight increases or decreases from the original ambient temperature viscosity. Each aqueous ambient temperature starch-EAA composition produced with this method is a paste that has a higher viscosity than the same ambient temperature composition without EAA.

Firm gels are prepared from the starch-EAA solution/dispersions by allowing the compositions to stand at ambient temperature without loss of water by evaporation. For example, the gels can be prepared by first cooling the solution/dispersions to about 30° C. as described and then pouring them into molds to stand for one day. In another, embodiment, hot solution/dispersions from steam-jet cooking are poured at 90° C. into molds and allowed to stand. Firm gels form rapidly and are stable for weeks when stored at either ambient temperature or at 4° C.

The strength/rigidity of the starch-EAA gels depends on both the starch variety used and the proportion of starch to EAA. Starches that normally do not form firm gels, such as waxy cornstarch or potato starch, gel rapidly into firm gels when cooked in the presence of even small amounts of EAA and allowed to stand for 24 hours. Thus, the addition of EAA to steam-jet cooked starches containing high percentages of amylopectin increased the strength of the resulting gels. On the other hand, high amylose cornstarch, which normally forms a rigid gel, remains firm but is softened by the presence of EAA.

While not wishing to be bound by any specific theory of operation, it is believed that the pronounced viscosity increases of starch dispersions during cooking in the presence of EAA are due to the formation of helical inclusion complexes between starch and EAA molecules. Presumably, the polymeric nature of EAA enables it to complex with more than one starch molecule thus forming pseudo-crosslinks.

With ordinary cooking, the major portion of the starch is not dissolved, but is present as highly swollen insoluble granule fragments. EAA apparently does not complex with this insoluble fraction, which comprises largely amylopectin, but does complex with the water soluble amylose which is solubilized during heating. It is this complexing that increases the viscosity. In steam-jet cooking, both amylose and amylopectin polymers are dissolved, in contrast to conventional cooking in which amylose is the major starch component solubilized.

The unique reduction in gel strength in the presence of EAA by starches that normally form rigid gels and the rigid gelling with EAA by starches that normally do not form rigid gels are consistent with a mechanism in which the formation of starch-EAA complexes sterically inhibits the slow hydrogen bonding, termed "retrogradation," that takes place between starch chains, particularly amylose, during cooling in the absence of EAA. Normally, by means of this slow hydrogen bonding, the individual amylose chains reaggregate, or "retrograde," to develop a new firm gel structure. EAA complexing with amylose interferes with and inhibits this normal amylose retrogradation. Thus, EAA can reduce the rigidity of high amylose cornstarch gels. However, with starches that normally show little or no tendency to form gels, like waxy corn starch and potato starch, which have a high percent of amylopectin, addition of EAA can cause gelling to take place through formation of psuedo-crosslinks when the EAA polymer complexes with two or more starch polymers. Thus, EAA addition can either increase or decrease gel strength/rigidity, depending upon how readily a particular starch will form a gel by itself in the absence of EAA.

An apparent contradiction exists with high amylose starch-EAA in that paste viscosity increases with the addition of EAA even when the EAA addition decreases gel strength. This can be explained by a mechanism in which starch-EAA complex formation increases paste viscosity while the starch-EAA complexing reduces gel strength and gel rigidity by interfering with and inhibiting the hydrogen bonding between amylose molecules.

The viscosity of the starch-EAA compositions is also affected by pH. For starches having a significant amylopectin component, such as cornstarch and waxy cornstarch, EAA increases ambient temperature viscosity to a greater extent as the pH is rendered more alkaline. On the other hand, more alkaline pH lowers the viscosity of high amylose cornstarch-EAA below 35° C., although this lowered viscosity is still greater than the viscosity of high amylose cornstarch in the absence of EAA. The pH is increased, for example, by adding either sodium hydroxide, in an amount equivalent to the carboxylic acid content of the EAA, or sufficient ammonium hydroxide to achieve an equivalent pH. A combination of ammonium hydroxide and sodium hydroxide also may be used. In one embodiment, 0.1N NaOH is added to the starch-EAA suspensions in aqueous ammonia before steam-jet cooking.

The described ambient temperature aqueous starch-EAA compositions have a broad range of applicability, for example where starch is used as a thickener or gelling agent. The compositions may be used as flocculating or coagulating agents, as viscosity regulating agents, and generally as industrial thickeners, such as for alkaline cleaning agents or paint remover formulations. Other uses are as carriers for air fresheners, sizing agents for textiles, and fillers for medical pads and cushions.

The firm gels may be used as substitutes for polysaccharide gums such as agar or carrageenin, and as electrophoretic gels.

The following examples are only illustrative of the invention. Changes and modifications in these specific examples, as in the foregoing embodiments, can be carried out without departing from the scope of the invention which is intended to be limited only by the scope of the claims.

EXAMPLE 1

The starches used were cornstarch, waxy cornstarch, high amylose cornstarch, potato starch and wheat starch. These starches were unmodified, i.e. they were native starches that had not been modified chemically. The cornstarch was Buffalo 3401 obtained from CPC International, Inc., of Argo, Ill. The waxy cornstarch was Amioca from National Starch and Chemical Corp., of Bridgewater, N.J. The high amylose cornstarch was Amylomaize VII from American Maize Products Co., Hammond, Ind. The wheat starch was AYTEX P obtained from Ogilvie Mills, Inc., Montreal, Quebec. The potato starch was obtained from Sigma Chemical Company, St. Louis, Mo. Cornstarch is about 25% amylose and 75% amylopectin. Waxy cornstarch is about 100% amylopectin. The commercial high amylose cornstarch used contained 70% amylose. All starch weights are given on a dry weight basis.

The EAA was Primacor 5981 from Dow Chemical Company, of Midland, Mich. This polymer contains about 20% copolymerized acrylic acid by weight and has a melt index of 300, a weight-average molecular weight of about 18,000, and a number-average molecular weight of about 7,000.

A 10% solution/dispersion of EAA in aqueous ammonium hydroxide was prepared by stirring 60 grams of EAA pellets in 600 milliliters of 50:50 (by volume) concentrated ammonium hydroxide/water in a flask equipped with a reflux condenser. The mixture was heated and stirred under gentle reflux at about 65° C.–85° C. for about 8 hours, and then allowed to cool. The slightly turbid solution was then diluted with concentrated ammonium hydroxide to a total weight of 600 g.

The required amount of 10% EAA solution was diluted with water to 1 liter, and granular starch was suspended in the resulting solution in an amount required to yield a desired weight percent of starch based on the total weight of the suspension.

All EAA percentages in these examples are weight percents based on the dry weight of starch present in each composition. Minor pH adjustments could be made by adding a few drops of ammonium hydroxide solution.

Control tests for starch without EAA were run using a volume of ammonium hydroxide/water solution equal to the volume of 10% EAA solution used in comparable EAA-containing mixtures.

The starch-EAA suspensions in aqueous ammonia were steam-jet cooked with a Penick & Ford laboratory model continuous cooker operated with 65 psig line pressure steam. Cooking was carried out at 140° C. (40 psig steam) with a pumping rate of about 1.1 liters per minute. Somewhat higher starch concentrations than those desired were used to allow for dilution of the cooked dispersions with condensed steam. For example, 66.7 grams of starch in 1 liter of aqueous EAA solution was used to obtain a final starch concentration of 5%.

The resulting cooked starch-EAA dispersions were collected in a Dewar flask where their temperature was maintained above 90° C. Swollen granule fragments were not evident in the steam-jet cooked product.

The cooked dispersions then were cooled, while their viscosities were measured continuously under low shear as a function of temperature and time with a Rotovisco model RV 100 viscometer, having an MV II cup, from Fisons Instruments, Inc., Paramus, N.J. The jacketed sample cup was attached to a circulating water bath initially held at 90° C. After the cup was filled with a starch-EAA dispersion at 90° C. from the steam-jet cooker, the bath was cooled to 22° C. at 0.97° C. per minute, and viscosity was recorded as a function of temperature and time. A low shear rate (10 reciprocal seconds) was used to minimize mechanical degradation of the starch-EAA complex. Upon cooling to 22° C., the viscometer was run for about 80 minutes at 22° C. to record any viscosity changes over time at the constant temperature. This provided 150 minutes of total stirring time. Throughout the procedure, water was retained in the compositions by avoiding water evaporation as much as possible.

Gels were prepared by pouring starch-EAA dispersions at 90° C. into disk molds made by placing cylindrical polyvinyl chloride rings on Lucite blocks covered with plastic wrap. The rings had an internal diameter of 77 ml and a nominal height of 10 ml. The molds were overfilled with cooked dispersion and covered with another block covered with plastic wrap, and the excess paste was forced out. A one kilogram weight was placed on the upper block, and samples were allowed to stand for 24 hours at ambient temperature. Gels formed rapidly upon cooling.

Gel strengths then were measured using compressional testing. The mold rings were removed, and the gels were compressed (by lubricated uniaxial compression) using a testing machine (Instron Universal Testing Machine, Model 1122) with a 50 kilogram load cell. Tests were carried out at a crosshead speed of 0.5 cm/min. Stress (Pa) was determined as a function of strain ($\Delta h/h$), where h is the actual height of a gel disk after compression by an amount $\Delta h$. $\Delta h$ is defined as h (initial gel height) minus h. Gel strength is represented by the amount of stress with a strain of 0.50, corresponding to a compression of 33.3% of the original sample thickness.

The viscosities obtained for jet cooked unmodified cornstarch compositions having various percentages of starch and EAA are listed in Table 1. Table 2 reports viscosities and gel

TABLE 1

| Unmodified Cornstarch (% solids in water) | EAA (% based on dry weight of starch) | Final pH | Ambient Temp. Paste Viscosity (mPa) |
|---|---|---|---|
| 10 | 1.0 | 8.48 | 3600[1] (3200)[2] |
| 10 | 0.5 | 8.15 | 2500 |
| 10 | 0.25 | 7.75 | 1400 |
| 10 | 0 | 8.85 | 1600 |
| 10 | 0 | 8.15 | 1400 |
| 10 | 0 | 5.03 | 700 |
| 5 | 10 | 8.83 | 12000 (10700) |
| 5 | 5 | 8.85 | 4800 (4000) |
| 5 | 3 | 8.80 | 2300 (1700) |

TABLE 1-continued

| Unmodified Cornstarch (% solids in water) | EAA (% based on dry weight of starch) | Final pH | Ambient Temp. Paste Viscosity (mPa) |
|---|---|---|---|
| 5 | 1 | 8.40 | 400 |
| 2.5 | 20 | 9.02 | 9000 |
| 2.5 | 10 | 8.85 | 4000 |
| 2.5 | 5 | 8.75 | 500 (400) |

[1]Maximum viscosity at ambient temperature.
[2]Viscosity after stirring for 150 minutes (stirring for about 80 minutes at 22° C.) if less than maximum viscosity.

strengths for different starches at 5% starch with 0%, 5% or 10% EAA. A steady increase in viscosity occurred with decreasing temperature, and viscosities at ambient temperature were significantly higher than the same starch compositions without EAA. The maximum viscosity, and the viscosity level as a function of temperature and time, depended on the starch variety used and on the starch-EAA ratio. At 10% unmodified cornstarch, a significant increase in viscosity over unmodified cornstarch without EAA was observed with as little as 0.5% EAA. Maximum viscosity sometimes required stirring to be continued for up to about 80 minutes at 22° C. For example, the maximum viscosity for high amylose cornstarch-EAA did not occur until the paste was

TABLE 2

| Starch Variety (5% starch solids in water) | EAA (% based on dry weight of starch) | Ambient Temp. Paste Viscosity (mPa) | Gel Strength[3] (Pa) |
|---|---|---|---|
| Corn | 5 | 4900[1] (4100)[2] | 800 |
| Wheat | 5 | 4900 (4100) | 800 |
| Waxy Corn | 5 | 3000 | — |
| Waxy Corn | 10 | — | 800 |
| High Amylose Corn | 5 | 4600 | 2200 |
| High Amylose Corn | 0 | 1300 | 7000 |
| Potato | 5 | 3200 (3100) | — |
| Potato | 10 | — | 2200 |

[1]Maximum viscosity at ambient temperature.
[2]Viscosity after stirring for 150 minutes (stirring for about 80 minutes at 22° C.) if less than maximum viscosity.
[3]Gel strength measured as the stress (Pa) at a strain of 0.50, which corresponds to a gel disk being compressed by an amount equal to 33.3% of its original thickness stirred for about 30 minutes at 22° C. Other samples achieved a maximum viscosity immediately upon cooling to ambient temperature, shortly before, or shortly thereafter. Waxy cornstarch achieved its maximum viscosity most quickly, doing so at about 35° C. Some samples then showed a slight loss in viscosity with prolonged stirring at 22° C. If the viscosity decreased from the maximum with prolonged stirring, then the lower viscosity produced by stirring for 150 minutes (about 80 minutes at 22° C.) is given in parenthesis. The maximum viscosity and any subsequently lower viscosity were significantly greater than the respective viscosities of the same starch compositions without EAA.

Gel strength was affected by both the starch variety and the starch-EAA ratio. Wheat starch, cornstarch, and high amylose cornstarch yielded firm gels with 5% starch solids, provided the EAA level was 5% or greater. With high amylose cornstarch with 5% EAA, gel strength was lower than the gel strength in the absence of EAA.

Waxy cornstarch and potato starch at 5% starch solids with 5% EAA did not yield gels sufficiently rigid for strength testing. Firm gels of these latter starches were obtained by increasing the EAA concentration to 10%. In contrast with these firm gels formed with the addition of 10% EAA, waxy cornstarch and potato starch do not form firm gels in the absence of EAA. Gels prepared from wheat starch and cornstarch (both with 5% EAA) and waxy cornstarch with 10% EAA are more elastic and less rigid than EAA-containing gels prepared from either potato starch (with 10% EAA) or high amylose starch (with 5% EAA).

EXAMPLE 2

The unmodified cornstarch and the EAA used were the same as in Example 1.

A 5% solution/dispersion of EAA in aqueous ammonium hydroxide was prepared by stirring 25 grams of EAA pellets in 500 ml of 50:50 (vol/vol) concentrated ammonium hydroxide/water in a flask equipped with a reflux condenser. The mixture was heated to 75° C., stirred at 75°–85° C. for about 6 hours, and allowed to cool. The slightly turbid solution was then diluted with concentrated ammonium hydroxide to a total weight of 500 g. A 10% EAA solution/dispersion was similarly prepared by heating 60 g of EAA in 600 ml of 50:50 (vol/vol) concentrated ammonium hydroxide/water and then diluting to a weight of 600 g.

An ammonium hydroxide control solution was prepared by a similar heating and diluting procedure, except that no EAA was added.

Prior to mixing with starch, 5 g either of 5% EAA solution/dispersion, 10% EAA solution or the control solution was diluted with water to 500 ml. 30 g of starch then was added to each solution. Minor pH adjustments could be made by adding a few drops of ammonium hydroxide solution. 30 g of starch in 500 ml yielded a starch-EAA dispersion with about 6% starch. 5 g of 5% EAA solution/dispersion, with 30 g of starch, yielded 0.83% EAA based on starch weight. 5 g of 10% EAA solution/dispersion, with 30 g of starch, yielded 1.67% EAA.

A starch-EAA solution/dispersion was made at near neutral pH for one test. Although lowering pH by evaporating ammonia from an EAA solution can cause EAA to precipitate, EAA remained soluble if 5 g of 10% EAA solution/dispersion was first diluted with water to 500 ml and then heated in an open beaker for about 2 hours at 80° C. to 85° C. to evaporate about one third of its volume leaving about 350 ml. After diluting the solution with water back to 500 ml, the resulting solution had a pH of 7.8. Adding 30 g of starch further reduced the pH to 7 or below. Since no excess ammonia was present, these starch-EAA slurries could be heated to 95° C.

A model VA-1B viscoamylograph from C. W. Brabender Instruments, Inc., of South Hackensack, N.J., was used to cook the starch-EAA slurries and to record viscosity changes as a function of temperature and time. The starch-EAA slurries, and the control solutions, were stirred at 75 rpm and heated at 1.5° C. per min to 85° C. (to 95° C. with a slurry or control solution at near neutral pH), held at this temperature for 30 minutes, and then cooled to 50° C. Stirring was continued for 30 min at 50° C., and then the cooked solution/dispersions were cooled to 30° C. During the heating and cooling phases, evaporation of water was avoided as much as possible.

Except in the tests at near neutral pH where excess ammonia had been removed, the maximum heating temperature was limited to 85° C. because the presence of ammonium hydroxide otherwise would cause the release of gaseous ammonia resulting in foaming in the cooked solution/dispersions.

The presence of EAA during cornstarch gelatinization increases viscosity at ambient temperature. Referring to Table 3, addition of EAA produced final viscosities of about 1,000 Brabender Units (BU) or higher at the end of the cooling cycle compared with significantly lower viscosities for the same systems without EAA. Table 3 shows that significant increases in paste viscosity at ambient temperature can be achieved by adding as little EAA as 0.25 g to 0.50 g (0.83% to 1.67% based on starch) to a 6% starch solution/dispersion (30 g of starch in 500 ml). Although paste viscosities in the presence of 0.83% EAA were not greatly different from those of the control at temperatures up to 85° C., the viscosity of the cooled starch-EAA paste was significantly higher. Addition of 1.67% EAA increased viscosities throughout the entire heating and cooling cycle.

TABLE 3

| Unmodified Cornstarch (% solids in water) | EAA (% based on dry weight of starch) | Final pH | Hot Paste Viscosity (BU)[1] | Ambient Temp. Paste Viscosity (BU)[1] | Gel Strength[2] (Pa) |
|---|---|---|---|---|---|
| 6 | 1.67 | 6.77 | 200[3] | >1000 | 620 |
| 6 | 0 | 7.0 | 200[3] | 650 | 1600 |
| 6 | 1.67 | 9.34 | 510[4] | >1000 | 600 |
| 6 | 0.83 | 9.50 | 230[4] | 1000 | 840 |
| 6 | 0 | 9.54 | 220[4] | 550 | 1800 |

[1]BU = Brabender Units
[2]Gel strength measured as the stress (Pa) at a strain of 0.75, which corresponds to a gel disk being compressed by an amount equal to 43% of its original thickness
[3]Measured at 95° C.
[4]Measured at 85° C.

A significant viscosity increase also was obtained at near neutral pH. A test at a pH of 6.77 with a composition of 6% unmodified cornstarch having EAA at 1.67% produced a cold paste viscosity of greater than 1000 BU, while a paste with the same starch content and a similar pH of 7.0 but with EAA absent produced a viscosity of only 650 BU.

Gels were prepared from starch-EAA solution/dispersions made in the Brabender amylograph. The gel preparation procedure was the same as in Example 1 except that the dispersions from the amylograph were poured into molds at 30° C. rather than at 90° C.

Gel strengths then were measured in the same manner as in Example 1. Referring to Table 3, the unmodified cornstarch gels with EAA had gel strengths less than those obtained without EAA. Adding as little as 0.83% EAA to starch reduced the strength of the resulting gel. A further reduction in gel strength was observed with the addition of 1.67% EAA to starch. Thus, addition of EAA to starch, which has not been totally solubilized but contains a substantial fraction consisting of swollen granules and granule fragments, produced increases in viscosity but decreases in gel strength.

We claim:
1. A method for making an aqueous ambient temperature starch and poly(ethylene-co-acrylic acid) paste or gel, comprising:

heating a mixture of starch and poly(ethylene-co-acrylic acid) in an aqueous medium to obtain a cooked aqueous solution/dispersion of the starch and the poly(ethylene-co-acrylic acid); and, cooling the aqueous solution/dispersion to ambient temperature with water retained in the solution/dispersion thereby to form an aqueous ambient temperature starch and poly(ethylene-co-acrylic acid) paste or gel, the starch being from about 2.5% to about 10%, by weight, of the paste or gel, and the poly(ethylene-co-acrylic acid) being from about 0.5% to about 20%, by weight, of the starch, the poly(ethylene-co-acrylic acid) content being sufficient to provide an aqueous ambient temperature paste having a higher viscosity than the same ambient temperature paste without poly(ethylene-co-acrylic acid) or an aqueous ambient temperature gel having a different gel strength from the same ambient temperature gel without poly(ethylene-co-acrylic acid).

2. The method of claim 1, wherein the poly(ethylene-co-acrylic acid) is less than 10%, by weight, of the starch.

3. The method of claim 1, wherein the starch is unmodified starch.

4. The method of claim 3, wherein the starch is cornstarch, waxy cornstarch, high amylose cornstarch, wheat starch or potato starch.

5. The method of claim 1, wherein heating the starch and poly(ethylene-co-acrylic acid) mixture comprises steam-jet cooking the mixture.

6. The method of claim 1, and including increasing the alkalinity of the starch and poly(ethylene-co-acrylic acid) mixture prior to heating.

7. The method of claim 1, wherein cooling the aqueous solution/dispersion includes allowing the solution/dispersion to stand to form a gel.

8. The method of claim 1, wherein ambient temperature is about 35° C. and lower.

* * * * *